United States Patent
Matsunaga

(10) Patent No.: US 6,470,271 B2
(45) Date of Patent: Oct. 22, 2002

(54) OBSTACLE DETECTING APPARATUS AND METHOD, AND STORAGE MEDIUM WHICH STORES PROGRAM FOR IMPLEMENTING THE METHOD

(75) Inventor: Shinichi Matsunaga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/741,021

(22) Filed: Dec. 21, 2000

(65) Prior Publication Data

US 2001/0018640 A1 Aug. 30, 2001

(30) Foreign Application Priority Data

Feb. 28, 2000 (JP) .................................. 2000-052557

(51) Int. Cl.⁷ .............................................. G06F 15/62
(52) U.S. Cl. ..................... 701/301; 701/96; 348/113; 348/118
(58) Field of Search ..................... 701/301, 28, 96, 701/300; 382/106, 107, 154, 276, 281; 348/113, 118

(56) References Cited

U.S. PATENT DOCUMENTS

| | | | | |
|---|---|---|---|---|
| 5,410,346 A | * | 4/1995 | Saneyoshi et al. | 348/116 |
| 5,515,448 A | * | 5/1996 | Nishitani | 382/106 |
| 5,530,420 A | * | 6/1996 | Tsuchiya et al. | 340/435 |
| 5,555,312 A | * | 9/1996 | Shima et al. | 382/104 |
| 5,555,555 A | * | 9/1996 | Sato et al. | 382/104 |
| 5,592,567 A | * | 1/1997 | Kilger | 382/199 |
| 5,617,085 A | * | 4/1997 | Tsutsumi et al. | 340/903 |
| 5,650,944 A | * | 7/1997 | Kise | 364/561 |

FOREIGN PATENT DOCUMENTS

| | | |
|---|---|---|
| JP | A-5-46739 | 2/1993 |
| JP | A-6-44363 | 2/1994 |
| JP | A-7-120257 | 5/1995 |
| JP | A-11-15979 | 1/1999 |

* cited by examiner

Primary Examiner—Tan Nguyen
(74) Attorney, Agent, or Firm—Arent Fox Kintner Plotkin & Kahn

(57) ABSTRACT

An obstacle detecting apparatus is disclosed, with which obstacles can be reliably detected so that a self-controlled robot or vehicle can drive safely. The apparatus comprises a first section having a distance sensor, for measuring the distance of each measurement point of objects existing in a visual field of the distance sensor and obtaining a three-dimensional coordinate value for each measurement point, so as to generate a distance image; a second section for projecting each measurement point of the objects onto at least one of predetermined horizontal and vertical planes, where each plane is divided into grid cells, and the resolution of the divided grid cells is lower than the measurement resolution of the distance sensor; and calculating the number of the measurement points projected onto each grid cell in the relevant plane, and generating a three-dimensional histogram indicating the distribution of the measurement points in the grid cells, a third section for converting the histogram to binary data by comparing the histogram with a predetermined threshold value; and a fourth section for extracting one or more obstacles by performing a clustering operation on the binary data, and generating an obstacle map by which the positional relationship between the distance sensor and each obstacle is determined.

8 Claims, 6 Drawing Sheets

DISTANCE IMAGE

OBSTACLE DETECTING APPARATUS AND METHOD, AND STORAGE MEDIUM WHICH STORES PROGRAM FOR IMPLEMENTING THE METHOD

BACKGROUND OF THE INVENTION

1. Field of the Invention

The present invention relates to an obstacle detecting apparatus and method, and a storage medium storing a program for detecting obstacles, in which obstacles are detected using a distance image (which indicates the distance of each measurement point) when a robot or vehicle moves.

2. Description of the Related Art

In conventional obstacle detecting methods, some constraints are imposed on the shapes of target objects to be detected (i.e., obstacles), and the obstacle detection is performed under the above constraints, by using a concentration image (based on the gray scale) or a distance image.

However, in actual indoor environments in which robots move, or on general roads on which vehicles drive, obstacles having various shapes exist; thus, it is not practical to detect obstacles under such constraints imposed on the shapes.

On the other hand, an obstacle map called an elevation map is known, in which each cell in a two-dimensional grid has assigned data relating to the height or the probability of existence. However, the method using the elevation map requires complicated operations using, for example, a potential-field method, so as to select a route for avoiding obstacles.

SUMMARY OF THE INVENTION

In consideration of the above circumstances, an objective of the present invention is to provide an obstacle detecting apparatus and method, and a storage medium storing a program for detecting obstacles, by which obstacles can be reliably detected so that a self-controlled robot or vehicle can drive safely.

Therefore, the present invention provides an obstacle detecting apparatus comprising:

a distance image obtaining section having a distance sensor, for measuring the distance of each measurement point of objects existing in a visual field in front of the distance sensor and obtaining a three-dimensional coordinate value for each measurement point, and generating a distance image based on the three-dimensional coordinate values of the measurement points;

a histogram generating section for:

projecting each measurement point of the objects onto a predetermined plane which is divided into grid cells; and calculating the number of the measurement points projected onto each grid cell in the plane, and generating a three-dimensional histogram indicating the distribution of the measurement points in the grid cells; and an obstacle map generating section for extracting one or more obstacles and generating an obstacle map based on the histogram, where the positional relationship between the distance sensor and each obstacle is determined by the obstacle map.

As a more specific structure, the present invention provides an obstacle detecting apparatus comprising:

a distance image obtaining section (e.g., the distance image obtaining section 1 in the embodiment explained below) having a distance sensor, for measuring the distance of each measurement point of objects existing in a visual field in front of the distance sensor and obtaining a three-dimensional coordinate value for each measurement point, and generating a distance image based on the three-dimensional coordinate values of the measurement points;

a histogram generating section (e.g., the image processing section 3 and histogram storage section 4 in the embodiment explained below) for:

projecting each measurement point of the objects onto at least one of predetermined horizontal and vertical planes, where each plane is divided into grid cells, and the resolution of the divided grid cells is lower than the measurement resolution of the distance sensor; and calculating the number of the measurement points projected onto each grid cell in the relevant plane, and generating a three-dimensional histogram indicating the distribution of the measurement points in the grid cells;

a binary converting section (e.g., the image processing section 3 in the embodiment explained below) for converting the histogram to binary data by comparing the histogram with a predetermined threshold value; and an obstacle map generating section (e.g., the image processing section 3 and obstacle map storage section 6 in the embodiment explained below) for extracting one or more obstacles by performing a clustering operation on the binary data obtained by the binary converting section, and generating an obstacle map by which the positional relationship between the distance sensor and each obstacle is determined.

According to the above structure, a histogram is generated by projecting the measurement points in the distance image onto each of one or two planes, and the obstacle map is generated based on the histogram(s). Therefore, obstacles can be easily detected, and the environment around the relevant vehicle, robot, or the like (which has this obstacle detection apparatus) can be easily recognized.

The obstacle detecting apparatus may further comprise a correcting section (e.g., the image processing section 3 and lookup table 5 in the embodiment explained below) for correcting the number of the measurement points projected onto each grid cell, calculated by the histogram generating section, based on the distance from the distance sensor to each measurement point.

In this case, the data are corrected according to each distance (of the measurement point) to the object; thus, the accuracy of the obstacle map can be improved.

The present invention also provides a vehicle drive control apparatus comprising an obstacle detecting apparatus as explained above, comprising:

a movement control section (e.g., the movement control section 7 in the embodiment explained below) for controlling the driving of a vehicle by referring to the obstacle map and controlling the vehicle to avoid the obstacles defined in the obstacle map.

According to this structure, the environment around the vehicle can be easily recognized, and the positioning control of the vehicle can be performed with high accuracy.

The present invention also provides a self-controlled robot comprising an obstacle detecting apparatus as explained above, comprising:

a movement control section (e.g., the movement control section 7 in the embodiment explained below) for controlling the movement of the robot by referring to the obstacle map and making the robot avoid the obstacles defined in the obstacle map.

According to this structure, the environment around the robot can be easily recognized, and the positioning control of the robot can be performed with high accuracy.

The present invention also provides an obstacle detecting method comprising:

a distance image obtaining step of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step of:
projecting each measurement point of the objects onto a predetermined plane which is divided into grid cells; and
calculating the number of the measurement points projected onto each grid cell in the plane, and generating a three-dimensional histogram indicating the distribution of the measurement points in the grid cells; and an obstacle map generating step of extracting one or more obstacles and generating an obstacle map based on the histogram, where the positional relationship between the distance sensor and each obstacle is determined by the obstacle map.

As a more specific method, the present invention provides an obstacle detecting method comprising:

a distance image obtaining step (corresponding to, for example, step S1 in the embodiment explained below) of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step (corresponding to, for example, steps S2 to S5 in the embodiment explained below) of:
projecting each measurement point of the objects onto at least one of predetermined horizontal and vertical planes, where each plane is divided into grid cells, and the resolution of the divided grid cells is lower than the measurement resolution of the distance sensor; and
calculating the number of the measurement points projected onto each grid cell in the relevant plane, and generating a three-dimensional histogram indicating the distribution of the measurement points in the grid cells;

a binary converting step (corresponding to, for example, steps S7 to S10 in the embodiment explained below) of converting the histogram to binary data by comparing the histogram with a predetermined threshold value; and an obstacle map generating step (corresponding to, for example, step S11 in the embodiment explained below) of extracting one or more obstacles by performing a clustering operation on the binary data obtained in the binary converting step, and generating an obstacle map by which the positional relationship between the distance sensor and each obstacle is determined.

According to the above method, the histogram is generated by projecting the measurement points in the distance image onto each of one or two planes, and the obstacle map is generated based on the histogram(s). Therefore, obstacles can be easily detected, and the environment around the relevant vehicle, robot, or the like (which has this obstacle detection apparatus) can be easily recognized.

The obstacle detecting method may further comprise a correcting step (corresponding to, for example, step S6 in the embodiment explained below) of correcting the number of the measurement points projected onto each grid cell, calculated in the histogram generating step, based on the distance from the distance sensor to each measurement point.

In this case, the data are corrected according to each distance (of the measurement point) to the object; thus, the accuracy of the obstacle map can be improved.

The present invention also provides a computer readable storage medium storing a program for making a computer execute an operation of detecting obstacles existing in a visual field of a distance sensor, the operation comprising:

a distance image obtaining step of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step of:
projecting each measurement point of the objects onto a predetermined plane which is divided into grid cells; and
calculating the number of the measurement points projected onto each grid cell in the plane, and generating a three-dimensional histogram indicating the distribution of the measurement points in the grid cells; and an obstacle map generating step of extracting one or more obstacles and generating an obstacle map based on the histogram, where the positional relationship between the distance sensor and each obstacle is determined by the obstacle map.

As a computer readable storage medium storing a more specific program, the present invention provides a computer readable storage medium storing a program for making a computer execute an operation of detecting obstacles existing in a visual field of a distance sensor, the operation comprising:

a distance image obtaining step of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step of:
projecting each measurement point of the objects onto at least one of predetermined horizontal and vertical planes, where each plane is divided into grid cells, and the resolution of the divided grid cells is lower than the measurement resolution of the distance sensor; and
calculating the number of the measurement points projected onto each grid cell in the relevant plane, and generating a three-dimensional histogram indicating the distribution of the measurement points in the grid cells;

a binary converting step of converting the histogram to binary data by comparing the histogram with a predetermined threshold value; and an obstacle map generating step of extracting one or more obstacles by performing a clustering operation on the binary data obtained in the binary converting step, and generating an obstacle map by which the positional relationship between the distance sensor and each obstacle is determined.

In the computer readable storage medium, the operation may further comprise a correcting step of correcting the number of the measurement points projected onto each grid cell, calculated in the histogram generating step, based on the distance from the distance sensor to each measurement point.

DESCRIPTION OF THE PREFERRED EMBODIMENTS

Hereinafter, the obstacle detecting apparatus as an embodiment according to the present invention will be explained in detail, with reference to the drawings.

Figure 1:
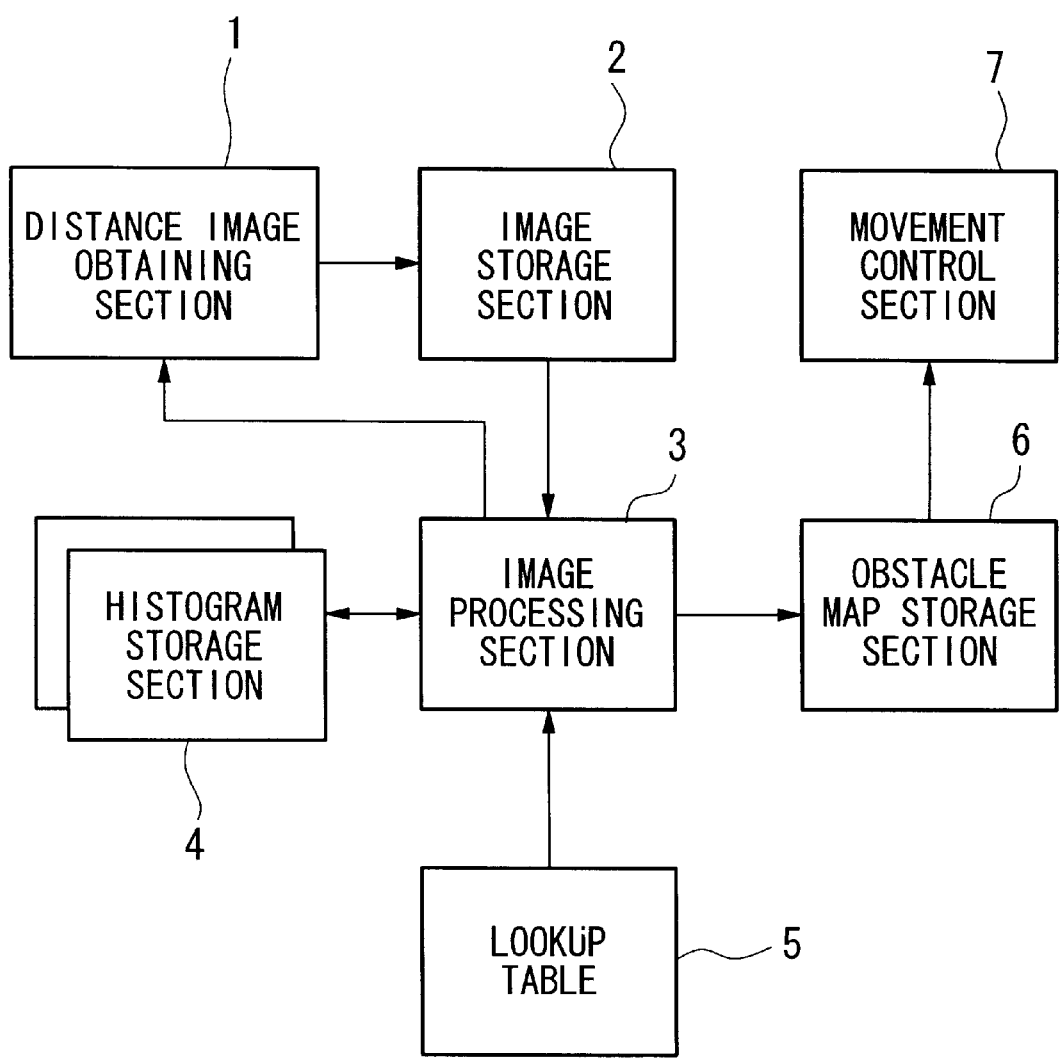
FIG. 1 is a block diagram showing the structure of the obstacle detecting apparatus as an embodiment according to the present invention.

FIG. 1 is a block diagram showing the structure of the obstacle detecting apparatus of the embodiment. In the figure, reference numeral 1 indicates a distance image obtaining section for obtaining a distance image (for indicating the distance of each point) of objects existing in a visual field in front of a moving robot or vehicle. The distance sensor used in the distance image obtaining section 1 comprises two CCD cameras, radars using electromagnetic waves, or the like. Reference numeral 2 indicates an image storage section for storing a frame of the distance image obtained by the distance image obtaining section 1. Reference numeral 3 indicates an image processing section for processing the distance image stored in the image storage section 2 and generating an obstacle map. Reference numeral 4 indicates a histogram storage section for storing histograms used when the distance image is converted to binary data. Reference numeral 5 indicates a lookup table in which data for correcting the histograms are stored. Reference numeral 6 indicates an obstacle map storage section for storing an obstacle map generated based on the distance image stored in the image storage section 2. Reference numeral 7 indicates a movement control section for controlling the movement of the robot or vehicle by referring to the obstacle map stored in the obstacle map storage section 6.

In the following explanations, it is assumed that the obstacle detecting apparatus as shown in FIG. 1 is built in a self-controlled robot which moves inside a room.

Here, the coordinate system used in the present embodiment is defined. The coordinate system consists of three orthogonal axes, where the front (distance) direction of the robot corresponds to the X axis, the right-left direction of the robot corresponds to the Y axis, and the vertical direction corresponds to the Z direction. In addition, the "distance" specifically indicates the distance of the straight line from the position of the distance image obtaining section 1 to each object. Therefore, the data of the distance image are a set of three-dimensional coordinate values of measurement points of objects existing in the visual field of the distance image obtaining section 1.

Figure 2:
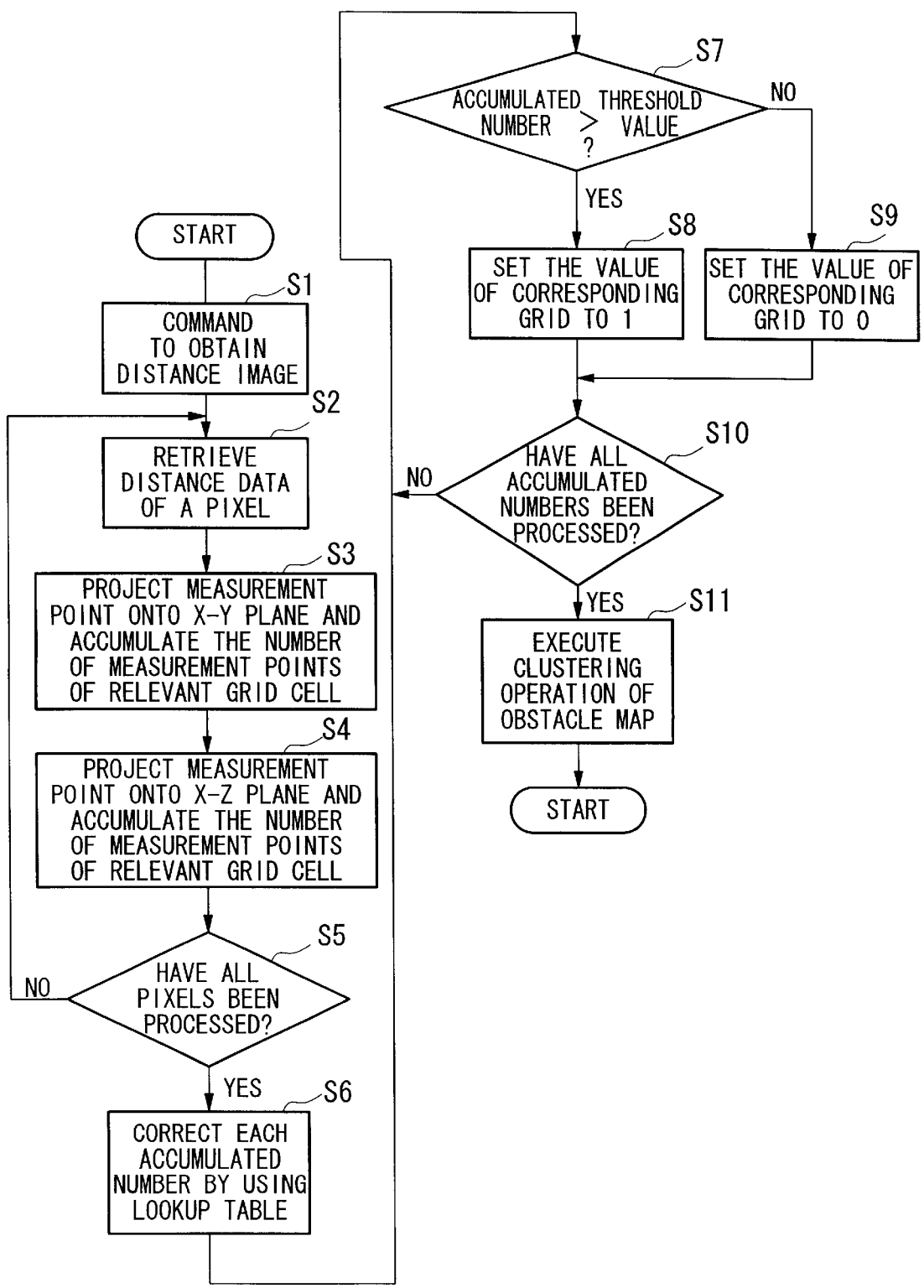
FIG. 2 is a flowchart showing the operation of the image processing section 3 in FIG. 1.

Below, the operation of the obstacle detecting apparatus as shown in FIG. 1 will be explained with reference to FIG. 2. FIG. 2 is a flowchart showing the operation of generating an obstacle map based on the distance image, performed by the image processing section 3.

Figure 3:
FIG. 3 is a diagram showing an example of the distance image obtained by the distance image obtaining section 1 in FIG. 1.

First, the image processing section 3 commands the distance image obtaining section 1 to obtain a current front-direction distance image at the present time (see step S1). According to this command, the distance image obtaining section 1 obtains a distance image, and A/D (analog to digital) converts the data of the image and stores the converted data for each measurement point in the image storage section 2. FIG. 3 shows an example of the distance image. In this example, a gray scale having 256 gradations is used, that is, the distance to each measurement point is represented using 8 bit data. In a usual image, the brightness of each point on the surface of each object in the visual field is indicated by using a corresponding pixel. In the distance image, the distance to each point on the surface of the objects in the visual field is represented by a pixel based on the 256 gradations. Therefore, the position of each pixel corresponds to a point in the Y-Z plane (that is, a corresponding point in the Y-Z plane is specified), and the distance data of the pixel corresponds to a point in the X axis, so that a point on a surface of the objects existing in three-dimensional space can be specified. If a higher accuracy is necessary, the accuracy can be increased by also using radar or the like. In addition, the output value of the distance sensor itself may be used instead of indicating the distance data by using 256 gradations.

In the next step, after the distance image is stored in the image storage section 2, the image processing section 3 retrieves distance data of one of the (unprocessed) pixels (see step S2). Based on the retrieved distance data, the coordinate value (X1, Y1, Z1) of a measurement point corresponding to the relevant pixel is calculated. The image processing section 3 then projects the measurement point onto the X-Y plane (see step S3). This projecting process is performed by setting the coordinate value Z1 to 0. Here, in the X-Y plane to which each measurement point is projected, grid cells, each having, for example, a square area of 5 cm×5 cm, are defined, where the resolution of the arrangement of the grid cells is lower than the measurement resolution of the distance sensor. After the projection, it is analyzed which grid cell includes the projected measurement point. The image processing section 3 accumulates the number of measurement points projected onto each grid cell (i.e., accumulation is performed for each cell), and the results are stored in the histogram storage section 4. That is, in step S3, the number of measurement points projected onto the relevant grid cell (to which the relevant measurement point is projected) is increased by 1. The image processing section 3 also projects the measurement point (X1, Y1, Z1) onto the X-Z plane (see step S4). This projecting process is performed by setting each coordinate value Y1 to 0. Similar to the relevant process related to the X-Y plane, the image processing section 3 accumulates the number of measurement points projected onto the relevant grid cell, and the result is stored in the histogram storage section 4. Here, depending on environmental conditions, only the X-Y or X-Z plane may be used in the implementation of the present invention.

Figure 4:
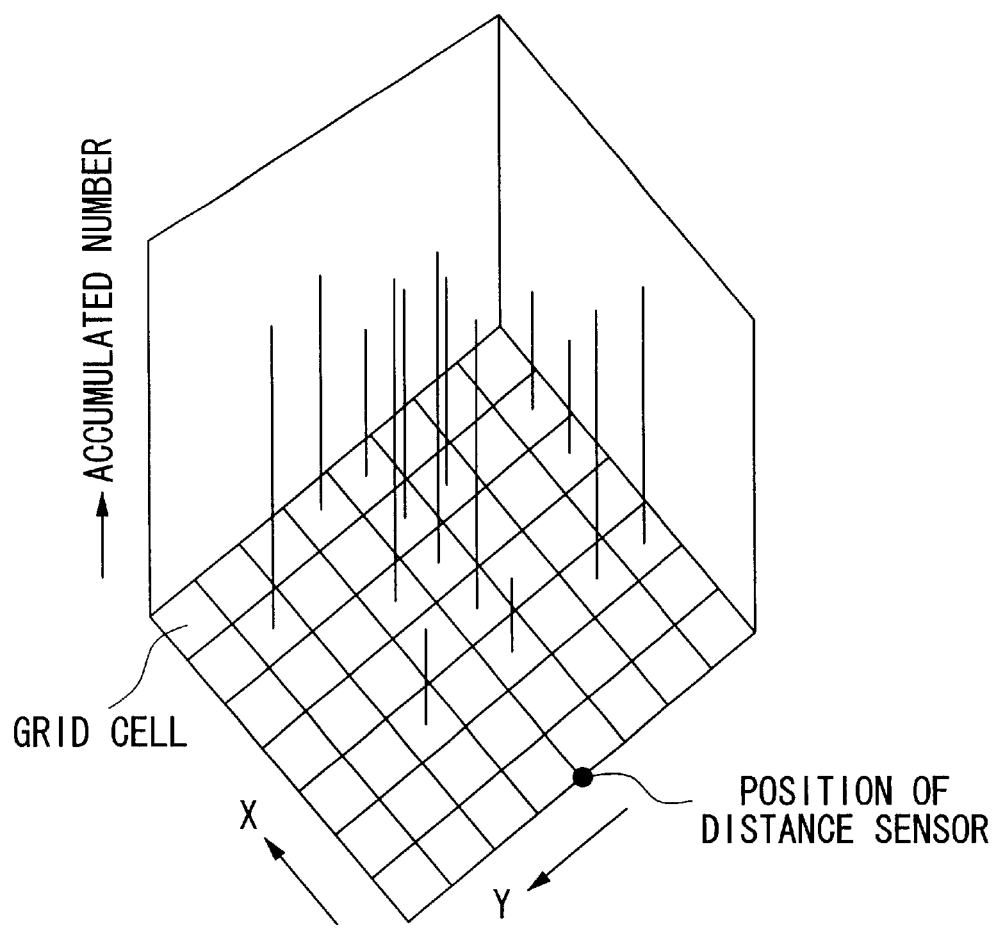
FIG. 4 is a diagram showing an example of the histogram stored in the histogram storage section 4 in FIG. 1.

In the next step S5, it is determined whether the processes of steps S3 and S4 have been executed for all pixels, and if there is a pixel which has not been processed, then the operation returns to step S2 and similar processes are repeated. When all pixels have been processed via steps S3 and S4, the histogram storage section 4 stores (i) the accumulated number of measurement points for each grid cell obtained in the projection towards the X-Y plane, and (ii) the accumulated number of measurement points for each grid cell obtained in the projection towards the X-Z plane. FIG. 4 shows an example of the histogram of the X-Y plane stored in the histogram storage section 4.

In the following step S6, the image processing section 3 corrects each accumulated number of measurement points with respect to the above two planes by referring to the lookup table 5. If CCD cameras are used in the distance sensor, an object further from the observation or view point has a smaller accumulated number, according to the (principle of) perspective. For example, if an object is shifted to a further point, each accumulated number of measurement points with respect to the object becomes smaller. Therefore, by referring to the lookup table 5 (for correcting the histograms) which is predetermined using parameters relating to the angle of view or possible procession range of the CCD camera, each accumulated number is corrected using the defined correction value assigned to each grid cell, so that each accumulated number of a distant object can also have a level as high as that of the accumulated numbers of a nearer object, and thus noise components can be removed.

Figure 5:
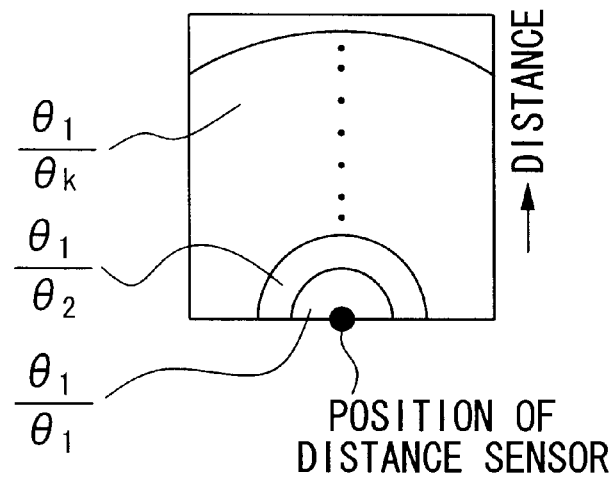
FIG. 5 is a diagram showing an example of the lookup table 5 in FIG. 1.

FIG. 5 shows an example of the lookup table 5. The image processing section 3 retrieves the correction value of each grid cell from the lookup table 5, and multiplys the corresponding accumulated value by the correction value, so that the each accumulated number is corrected. That is, the accumulated numbers of all the grid cells are corrected. The method of generating the lookup table 5 will be explained below.

In the next step S7, the image processing section 3 compares the (corrected) accumulated number of the histogram stored in the histogram storage section 4 with a predetermined threshold value for each grid cell, and if the accumulated number is larger than the threshold value, then value "1" is assigned to the grid cell, and the result is stored in the obstacle map storage section 6 (see step S8). On the other hand, if the accumulated number is equal to or smaller than the threshold value, then value "0" is assigned to the grid cell, and the result is stored in the obstacle map storage section 6 (see step S9). The above processes from step S7 to S9 are executed for all the grid cells (see step S10). Accordingly, the obstacle map storage section 6 stores binary data in which "1" is assigned to each grid cell whose accumulated number is larger than the predetermined threshold value, while "0" is assigned to each grid cell whose accumulated number is equal to or below the threshold value. The above process is executed for each grid cell in the X-Y plane, and also for each grid cell in the X-Z plane.

The threshold value used in step S7 is determined so as to remove noise components, in consideration of the error of the measured data obtained by the distance image obtaining section 1.

Figure 6:
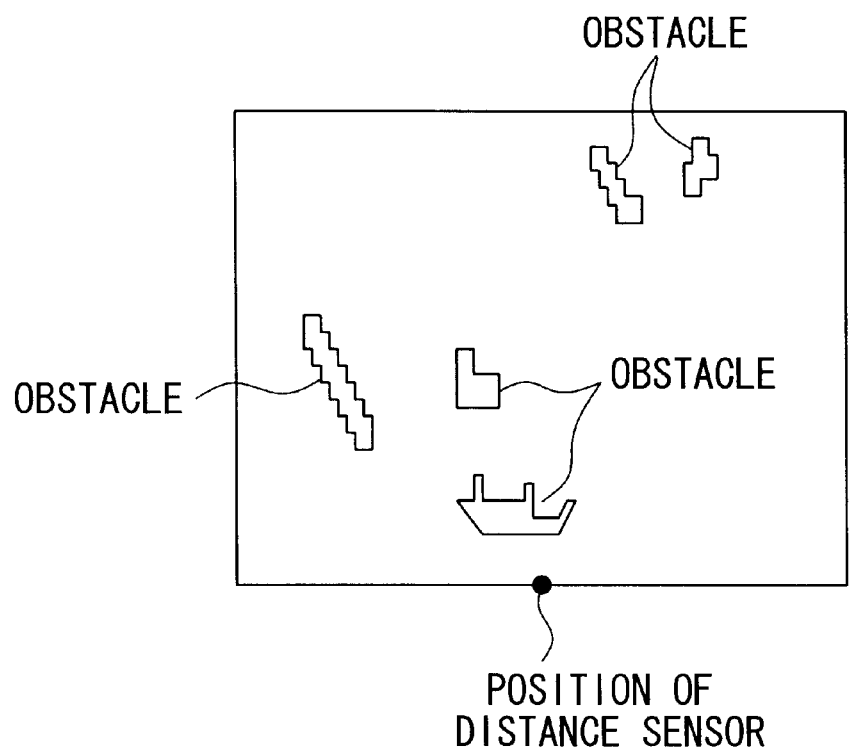
FIG. 6 is a diagram showing an example of the obstacle map stored in the obstacle map storage section 6 in FIG. 1.

In the following step S11, the clustering operation is performed for the obstacle map 6. The clustering operation is a known technique, in which adjacent grid cells having value "1" are grouped. Each portion generated by this clustering (i.e., grouping) operation is recognized as an obstacle. The clustering operation is performed for each grid cell on the X-Y plane and the X-Z plane, and obstacles are extracted according to the results relating to the two planes. FIG. 6 shows an example of an obstacle map which indicates the results of the obstacle extraction. The relative-position relationship between the distance image obtaining section 1 and each obstacle is determined (or calculated) based on the area size and position of the relevant grid cells.

When the clustering operation is completed, the operation of generating an obstacle map based on the distance image obtained in the step S1 is completed. The image processing section 3 then repeats the processes from step S1 to step S11 again, so as to update the obstacle map.

The movement control section 7 sets the driving route of the robot while referring to the obstacle map which is continuously updated, thereby controlling the movement of the robot.

The method of generating the lookup table 5 will be explained with reference to FIG. 7. As shown in the figure, pictures of objects having the same height are taken using a CDD camera which is horizontally attached, and the correction values in consideration of each distance are determined based on the ratio of the angle θ for covering each object in the vertical direction (refer to $\theta_1$ and $\theta_k$ in FIG. 7).

Figure 7:
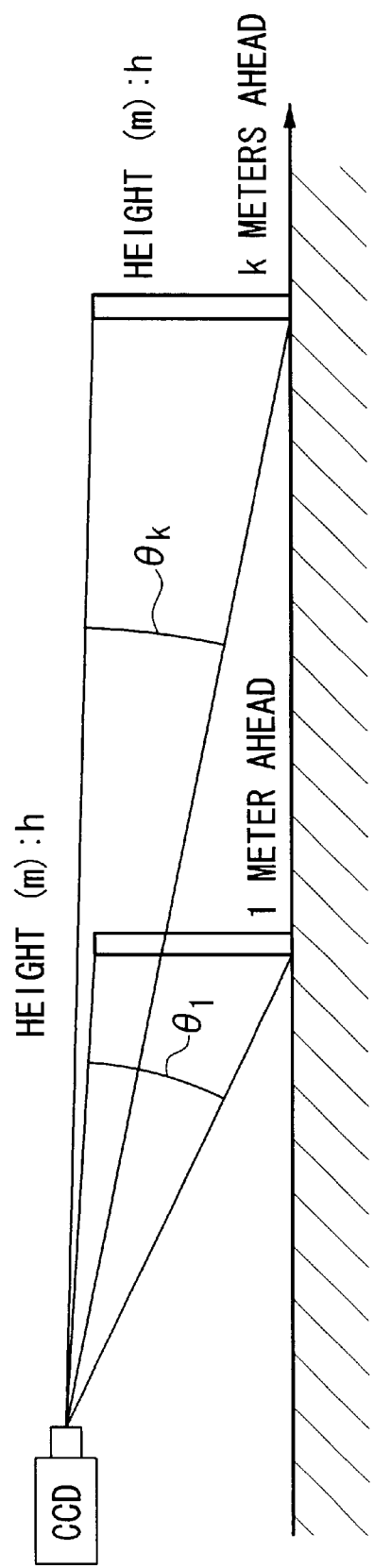
FIG. 7 is a diagram for explaining the method of generating the lookup table 5 as shown in FIG. 5.

In the example of FIG. 7, an object having a height of h meters is assumed. When the object is positioned at 1 meter ahead of the view point, the angle occupied by the object in the vertical direction is defined as $\theta_1$. This angle $\theta_1$ is used as the reference angle. On the other hand, when an object having the same height (h meters) is positioned at k meters ahead of the view point, the angle occupied by the object in the vertical direction is defined as $\theta_k$. Under these definitions, the ratio $\theta_1/\theta_k$ is calculated for some predetermined distances from the view point, and the results are assigned to corresponding grid cells, so that a lookup table as shown in FIG. 5 is determined.

As explained above, the histograms relating to measurement points projected onto two planes are generated, and an obstacle map is generated based on the histograms. Therefore, obstacles can be easily detected. In addition, measured data are corrected according to the distance to each object; thus, the accuracy of the obstacle map can be improved. Furthermore, the movement of the robot is controlled while the obstacle map is continuously referred to; thus, the positioning control of the robot can be accurately performed.

In the above embodiments, each accumulated number is corrected using the lookup table 5; however, the correction value by which the accumulated number is multiplied may be the distance itself. In this case, the lookup table 5 can be omitted. In another example for omitting the lookup table 5, the threshold value used in step S7 may be changed according to each distance. That is, the longer the distance is, the smaller the threshold value becomes.

What is claimed is:

1. An obstacle detecting apparatus comprising:
    a distance image obtaining section having a distance sensor, for measuring the distance of each measurement point of objects existing in a visual field in front of the distance sensor and obtaining a three-dimensional coordinate value for each measurement point, and generating a distance image based on the three-dimensional coordinate values of the measurement points;

a histogram generating section for:
projecting each measurement point of the objects onto at least one of predetermined horizontal and vertical planes, where each plane is divided into grid cells, and the resolution of the divided grid cells is lower than the measurement resolution of the distance sensor; and calculating the number of the measurement points projected onto each grid cell in the relevant plane, and generating a three-dimensional histogram indicating the distribution of the measurement points in the grid cells;

a binary converting section for converting the histogram to binary data by comparing the histogram with a predetermined threshold value; and an obstacle map generating section for extracting one or more obstacles by performing a clustering operation on the binary data obtained by the binary converting section, and generating an obstacle map by which the positional relationship between the distance sensor and each obstacle is determined.

2. An obstacle detecting apparatus as claimed in claim 1, further comprising:

a correcting section for correcting the number of the measurement points projected onto each grid cell, calculated by the histogram generating section, based on the distance from the distance sensor to each measurement point.

3. A vehicle drive control apparatus comprising an obstacle detecting apparatus as claimed in one of claims 1 and 2, comprising:

a movement control section for controlling the driving of a vehicle by referring to the obstacle map and controlling the vehicle to avoid the obstacles defined in the obstacle map.

4. A self-controlled robot comprising an obstacle detecting apparatus as claimed in one of claims 1 and 2, comprising:

a movement control section for controlling the movement of the robot by referring to the obstacle map and making the robot avoid the obstacles defined in the obstacle map.

5. An obstacle detecting method comprising:

a distance image obtaining step of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step of:
projecting each measurement point of the objects onto at least one of predetermined horizontal and vertical planes, where each plane is divided into grid cells, and the resolution of the divided grid cells is lower than the measurement resolution of the distance sensor; and calculating the number of the measurement points projected onto each grid cell in the relevant plane, and generating a three-dimensional histogram indicating the distribution of the measurement points in the grid cells;

a binary converting step of converting the histogram to binary data by comparing the histogram with a predetermined threshold value; and an obstacle map generating step of extracting one or more obstacles by performing the clustering operation of the binary data obtained in the binary converting step, and generating an obstacle map by which the positional relationship between the distance sensor and each obstacle is determined.

6. An obstacle detecting method as claimed in claim 5, further comprising:

a correcting step of correcting the number of the measurement points projected onto each grid cell, calculated in the histogram generating step, based on the distance from the distance sensor to each measurement point.

7. A computer readable storage medium storing a program for making a computer execute an operation of detecting obstacles existing in a visual field of a distance sensor, the operation comprising:

a distance image obtaining step of measuring the distance of each measurement point of objects existing in a visual field in front of a distance sensor and obtaining a three-dimensional coordinate value for each measurement point, and generating a distance image based on the three-dimensional coordinate values of the measurement points;

a histogram generating step of:
projecting each measurement point of the objects onto at least one of predetermined horizontal and vertical planes, where each plane is divided into grid cells, and the resolution of the divided grid cells is lower than the measurement resolution of the distance sensor; and calculating the number of the measurement points projected onto each grid cell in the relevant plane, and generating a three-dimensional histogram indicating the distribution of the measurement points in the grid cells;

a binary converting step of converting the histogram to binary data by comparing the histogram with a predetermined threshold value; and an obstacle map generating step of extracting one or more obstacles by performing a clustering operation on the binary data obtained in the binary converting step, and generating an obstacle map by which the positional relationship between the distance sensor and each obstacle is determined.

8. A computer readable storage medium as claimed in claim 7, wherein the operation further comprises:

a correcting step of correcting the number of the measurement points projected onto each grid cell, calculated in the histogram generating step, based on the distance from the distance sensor to each measurement point.

* * * * *